United States Patent
Moon et al.

(10) Patent No.: US 6,940,477 B2
(45) Date of Patent: Sep. 6, 2005

(54) DIGITAL VIDEO SIGNAL INTERFACE MODULE FOR TRANSFERRING SIGNALS TO A LONG DISTANCE

(75) Inventors: Jong-Kook Moon, Suwon (KR); Jong-Do Kwak, Suwon (KR)

(73) Assignee: Ophit Co., Ltd., Osan (KR)

(*) Notice: Subject to any disclaimer, the term of this patent is extended or adjusted under 35 U.S.C. 154(b) by 632 days.

(21) Appl. No.: 09/984,652

(22) Filed: Oct. 30, 2001

(65) Prior Publication Data

US 2003/0034963 A1 Feb. 20, 2003

(30) Foreign Application Priority Data

May 26, 2001 (KR) .......................................... 2001-29271

(51) Int. Cl.[7] .................................................. G09G 3/36
(52) U.S. Cl. ........................... 345/87; 398/182; 385/100
(58) Field of Search ........................ 174/36, 115, 117 R; 235/454, 492; 250/227.19, 227.27; 356/477–483; 385/100–121; 398/193–198

(56) References Cited

U.S. PATENT DOCUMENTS

| | | | |
|---|---|---|---|
| 5,850,305 A | * 12/1998 | Pidgeon | 398/193 |
| 6,446,867 B1 | * 9/2002 | Sanchez | 235/454 |
| 6,498,652 B1 | * 12/2002 | Varshneya et al. | 356/477 |
| 6,629,638 B1 | * 10/2003 | Sanchez | 235/454 |

* cited by examiner

Primary Examiner—Sumati Lefkowitz
Assistant Examiner—Srilakshmi K. Kumar
(74) Attorney, Agent, or Firm—Staas & Halsey LLP (57) ABSTRACT

The present invention discloses a digital video signal interface module that enables a distance between a computer having a digital video output and a monitor having a digital video input to length and comprises a laser driver and a laser diode receiving digital video signals of Red (R), Green (G), Blue (B), Clock (C) outputted from a computer and converting the signals to a laser signals, respectively; a photodiode (PD) receiving the respective laser signals and restoring to electric signals; a photodiode amplifier amplifying the signals of the photodiode and transferring the signals to a Liquid Crystal Display (LCD) monitor; a plurality of an optic fiber installed between the respective laser diode and the respective phoptodiode and transferring the laser signals; and a power supply line and a ground voltage line installed between the computer and the LCD monitor along the optic fibers and supplying a power voltage to the laser driver and the PD amplifier.

10 Claims, 10 Drawing Sheets

DIGITAL VIDEO SIGNAL INTERFACE MODULE FOR TRANSFERRING SIGNALS TO A LONG DISTANCE

CROSS REFERENCE

This application claims the benefit of Korean Patent Application No. 2001-29271, filed on May 26, 2001, under 35 U.S.C. § 119, the entirety of which is hereby incorporated by reference.

BACKGROUND OF THE INVENTION

1. Field of the Invention

The present invention relates to a video cable between a computer and monitor, more particularly, to a digital video signal interface module that is able to lengthen a transferring distance of a computer outputting a digital video output and a monitor inputting a digital video input.

2. Description of Related Art

The video signal outputted from a conventional computer is an analog type or a digital type. The analog type is generally applied to a conventional cathode ray tube (CRT) type and the digital type is generally applied to the monitors such as a liquid crystal display (LCD). Accordingly, A-D converter is used when the LCD monitor is used for the computer outputting the analog video output.

However, many computers that output the digital video signals have been emerged according to a popularization of the LCD monitors. Subsequently, many people can enjoy images of the clean digital signals without an additional A-D converter.

But, there is a problem that the digital signals cannot be transferred because a frequency of a digital interface type is a high frequency of hundreds MHz to several GHz.

Accordingly, an additional amplifier has been used for the monitor installed in ships, trains, medical instruments, outdoor billboards, departments, and elevators, etc., when a distance between the computer and the monitor is about 5 to tens meters.

Figure 1:
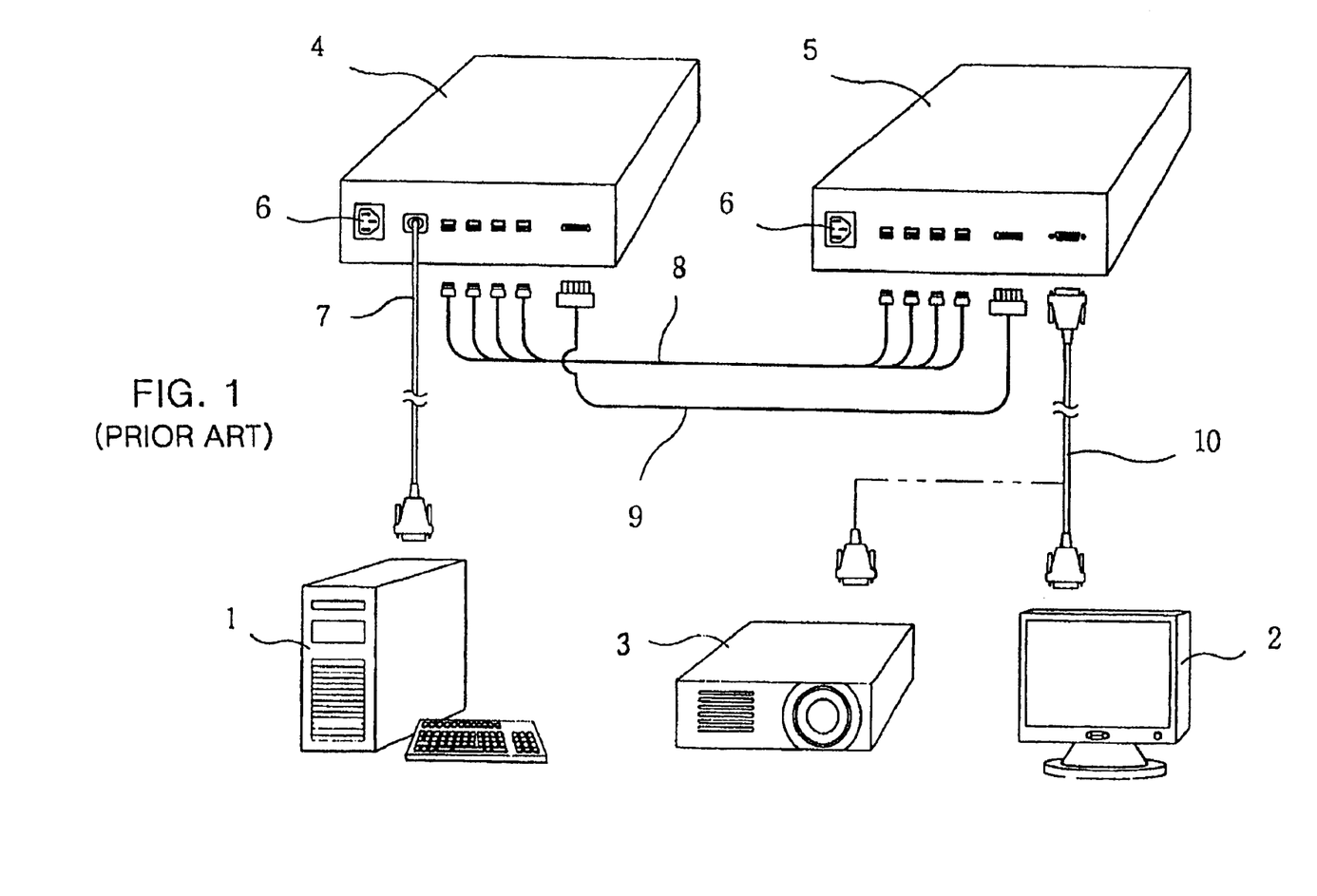
FIG. 1 is a configuration drawing illustrating a system of a conventional computer transferring a digital signal to a long distance.

FIG. 1 shows a configuration drawing illustrating a system for transferring the digital signals to a long distance adopted for a Digital Visual Interface (DVI) standard of a conventional computer.

As shown in FIG. 1, the conventional system is configured as a computer (1) which is able to output the digital video signals, an amplifier (4), a receiver (5), and a LCD monitor (2). One terminal of a first digital exclusive use line (7) is connected to a video output terminal (not shown) of the computer (1) and another terminal of the first digital exclusive use line (7) is connected to the amplifier (4). The amplifier (4) generates signals of Red (R), Green (G), Blue (B), Clock (C) after amplifying the digital signals using an external power supply (6). The receiver (5) transfers the R, G, B, C signals to the LCD monitor (2) through a second digital exclusive use line (10) after adjusting the R, G, B, C signals to regular voltage levels using the external power supply (6). The rapid R, G, B, C signals are transferred through a Bayonet Neil-Concelman (BNC) connector line (8).

Also, a Data Display Channel (DDC) signal for transferring an information of the monitor (2) to the computer (1) is consisted of a DDC clock, a DDC data and a Hot Plug Detect (HPD). The DDC signal is connected between the amplifier (4) and the receiver (5) through an additional DDC line (9) greatly attenuating the signals. If necessary, a digital projector (3) can be used in lieu of or together with the monitor (2). Because the above cited system is used, the distance between the amplifier (4) and the receiver (5) becomes long several to tens meters.

However, there are problems that the amplifier (4) and the receiver (5) of the conventional system require the external power supply (6), two digital exclusive use lines (7, 10), four BNC lines (8), and a complex DDC line (9), the system is complexed, and a production cost is high because the components are many, and an installation is inconvenient, etc.

Figure 2:
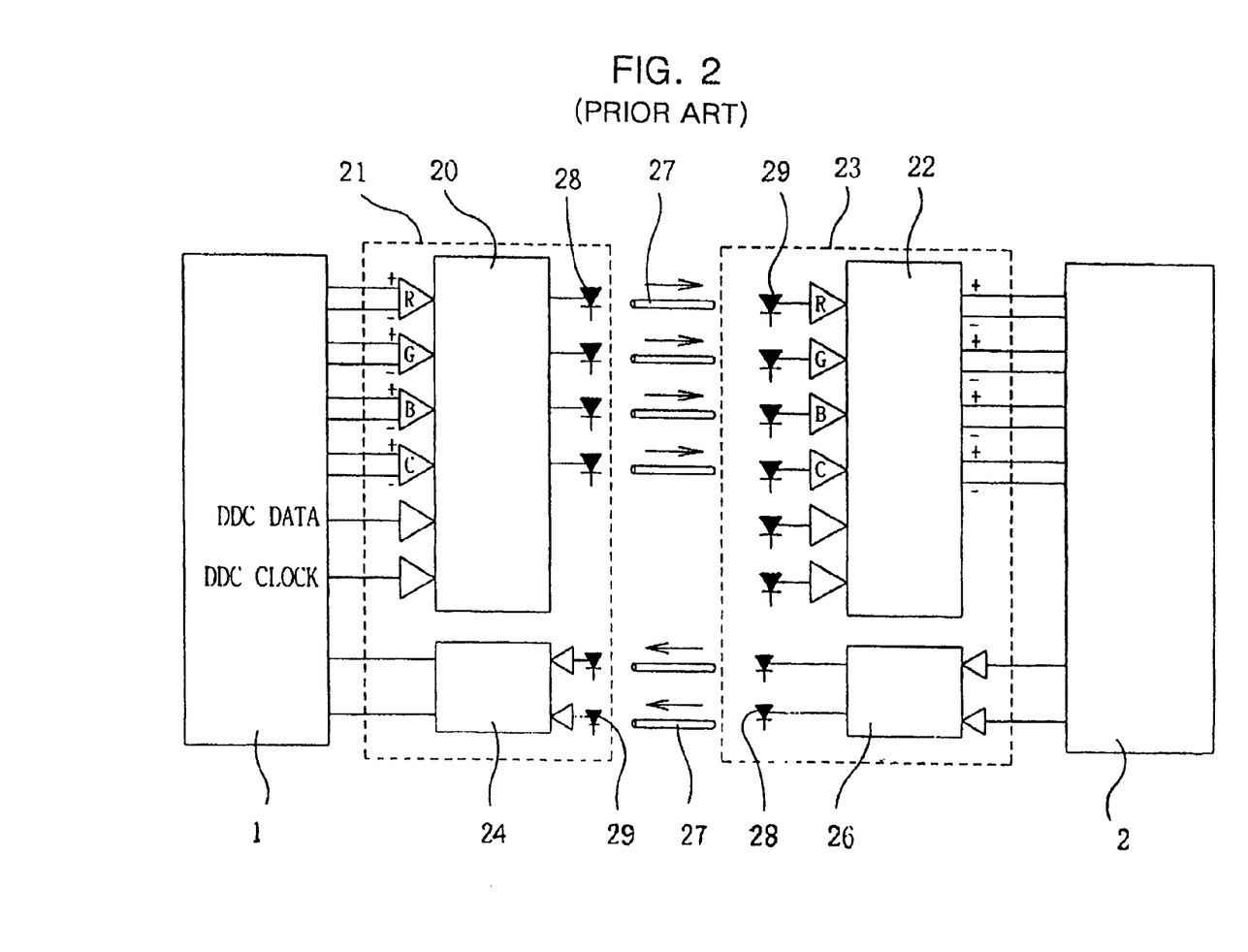
FIG. 2 is a configuration drawing illustrating signals for all digital interfaces consisting of optic signals.

FIG. 2 is a configuration drawing that signals for all digital interfaces are consisted of light before a system of the present invention is realized. As shown in FIG. 2, the system is roughly consisted of a computer (1), a transmitter (21), an optic fiber (27), a receiver (23), and a LCD monitor (2), R, G, B, C signals, a DDC date, a DDC clock (six channels) outputted from the computer (1) is respectively converted to optic signals in six laser diodes (28) by a laser driver (20). The converted optic signals are transferred to a long distance through the six optic fibers (27). Six photodiodes (29) restore the received optic signals to electric signals and a Photo-Diode (PD) amplifier (22) amplifies a weak electric signal to a predetermined voltage level. The amplified signal is transferred to and displayed on the LCD monitor (2).

On the other hand, the system has an additional two channel laser driver (26) and the laser diode (28) in the receiver (23), and an additional two channel PD amplifier (24) in the receiver (21). And, additional two lines of the optic fibers are used for transferring the signals.

When all signals are converted into the optic signals, eight lines of the optic fibers are required, and this results in combining six channels system with two channels system. The production cost becomes raised and a transferring velocity of the DDC signal is too late to transfer the optic signal because of a low frequency of 100 kHz.

Also, A Digital Visual Interface (DVI) standard of the digital interface must essentially has a HPD function in an operating system beyond window 95. The HPD function is operated by detecting a DC +5 V, but the above cited system cannot support the HPD function. That is, for supporting the HPD function in the above cited system, an additional signal is inserted into other signals and transferred, and the receiver must detect the additional signal using a micom. However, the method becomes more complicated in a structure of the system and the production cost becomes raised.

The extra problem is that the power supply must be supplied from the outsides in order to operate functional devices of the receiver because the extra pins do not exist in order to supply the power supply from the monitor in the receiver under DVI, DFP, or Low Voltage Differential Signalling (LVDS) of the digital interface standards.

SUMMARY OF THE INVENTION

To overcome the problems described above, preferred embodiments of the present invention provide a digital video signal interface module that is able to transfer the signals to a long distance using an optic element and an optic fiber.

Also, preferred embodiments of the present invention provide a digital video signal interface module that is able to transfer the signals to a long distance without an additional power supply by embedding cupper lines connected to the power supply except the optic fiber in a cable.

More over, preferred embodiments of the present invention provide a digital video signal interface module that is able to transfer the signals to a long distance by supplying the power to a laser driver from a transferring connector and to a PD amplifier from a receiving connector, thereby minimizing an emission of an Electro Magnetic Interface (EMI).

In order to achieve the above object, the preferred embodiment of the present invention provides a digital video signal interface module that is able to transfer signals to a long distance comprising, a laser driver and a laser diode receiving digital video signals of R, G, B, C outputted from a computer and converting the signals to laser signals, respectively; a photodiode receiving the respective laser signals and restoring to electric signals; a photodiode amplifier amplifying the signals of the photodiode and transferring the signals to a LCD monitor; a plurality of an optic fiber installed between the respective laser diode and the respective photodiode and transferring the laser signals; and a power supply line and a ground voltage line installed between the computer and the LCD monitor along the optic fibers and supplying a power voltage to the laser driver and the PD amplifier.

Also, the other preferred embodiment of the present invention provides a digital video signal interface module that is able to transfer signals to a long distance comprising laser driver and laser diode receiving a digital video signals of R, G, B, C outputted from a computer and converting the signals to laser signals, respectively; a photodiode receiving the respective laser signals and restoring to electric signals; a photodiode amplifier amplifying the signals of the photodiode and transferring the signals to a LCD monitor; a plurality of an optic fiber installed between the respective laser diode and the respective photodiode and transferring the laser signals; an information transferring means installed between the computer and the LCD monitor and transferring an information about the LCD monitor to the computer; and a power supply line and a ground voltage line installed between the computer and the LCD monitor along the optic fibers and supplying a power voltage to the laser driver and the PD amplifier.

More over, the other preferred embodiment of the present invention provides a digital video signal interface module that is able to transfer signals to a long distance comprising a laser driver and a laser diode receiving a digital video signals of R, G, B, C outputted from a computer and converting the signals to laser signals, respectively; a photodiode receiving the respective laser signals and restoring to electric signals; a photodiode amplifier amplifying the signals of the photodiode and transferring the signals to the LCD monitor; a plurality of an optic fiber installed between the respective laser diode and the respective photodiode and transferring the laser signals; a first power supply line and a first ground voltage line supplying a power voltage to the computer and the laser driver; and a second power supply line and a second ground voltage line supplying a power voltage to the computer and the laser driver.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to a preferred embodiment of the present invention, example of which is illustrated in the accompanying drawings.

A "long distance" is defined as about 5 to hundreds meters between a computer body and a monitor in the present invention.

Figure 3:
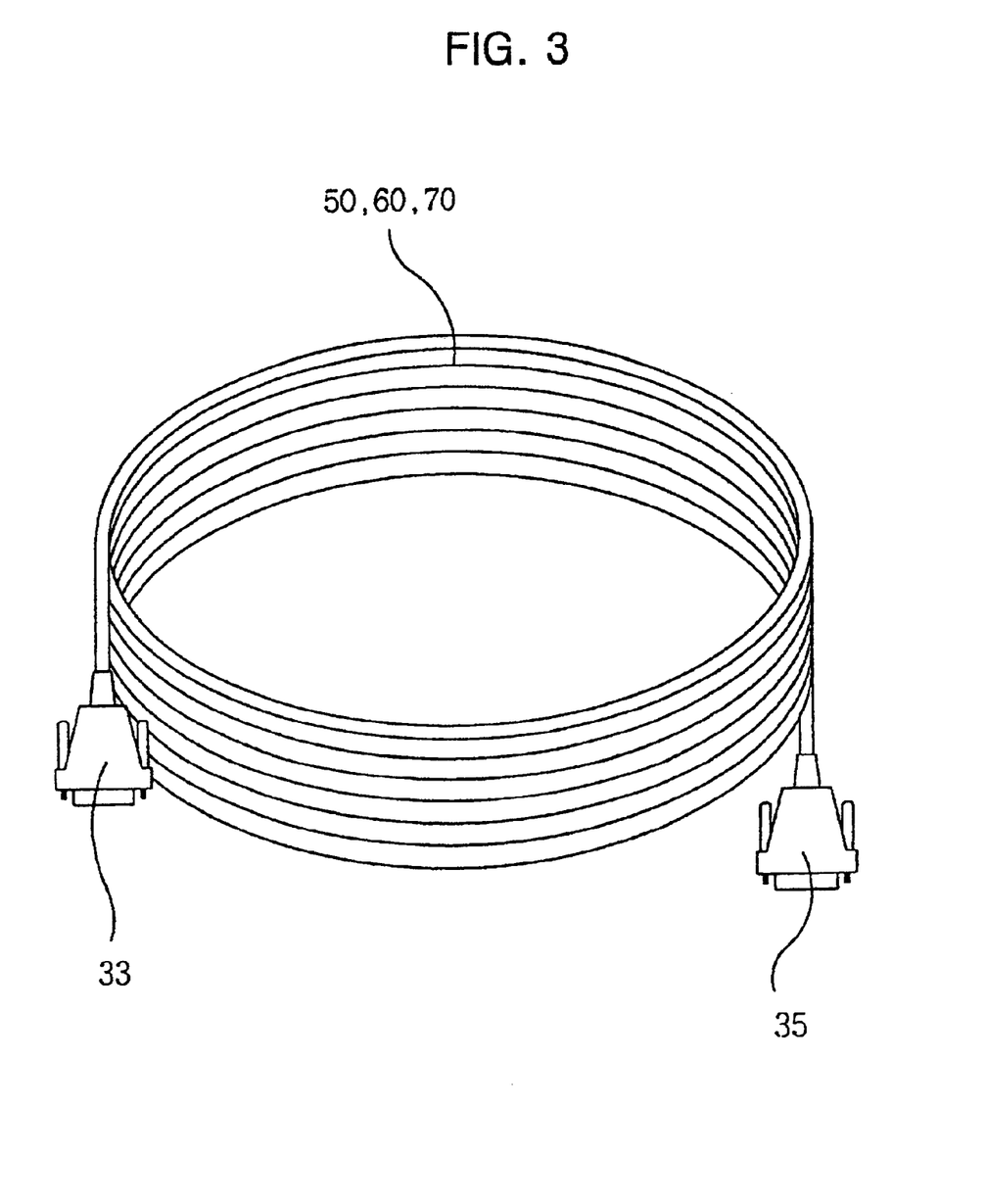
FIG. 3 is a perspective drawing illustrating a digital video signal interface module which is able to transfer signals to a long distance according to a preferred embodiment of the present invention.

FIG. 3 is a perspective drawing illustrating a digital video signal interface module that is able to transfer signals to a long distance according to a preferred embodiment of the present invention.

As shown in FIG. 3, a transferring connector (33) for a computer (1) and a receiving connector (35) for a monitor are installed in both terminals of cables (50, 60, 70) having length of about 10 to hundreds meters.

Table 1 represents a detail information of each pins used in the connectors (33, 35).

TABLE 1

| Pin No. | Signal | Pin No. | Signal | Pin No. | Signal |
|---|---|---|---|---|---|
| 1 | TMDS data 2− | 9 | TMDS data 1− | 17 | TMDS data 0− |
| 2 | TMDS data 2+ | 10 | TMDS data 1+ | 18 | TMDS DATA 0+ |
| 3 | TMDS data ⅔ shielded | 11 | TMDS DATA ⅓ shielded | 19 | TMDS data 0/5 shielded |
| 4 | TMDS data 4− | 12 | TMDS data 3− | 20 | TMDS DATA 5− |
| 5 | TMDS Data 4+ | 13 | TMDS data 3+ | 21 | TMDS data 5+ |
| 6 | DDC clock | 14 | +5 V | 22 | TMDS data clock shielded |
| 7 | DDC data | 15 | Ground (for +5 V) | 23 | TMDS data clock + |
| 8 | No Connect | 16 | Hot Plug Detect | 24 | TMDS data clock− |

Wherein, TMDS is a coding algorithm of a DVI and besides there is a connector of FP type.

Figure 4:
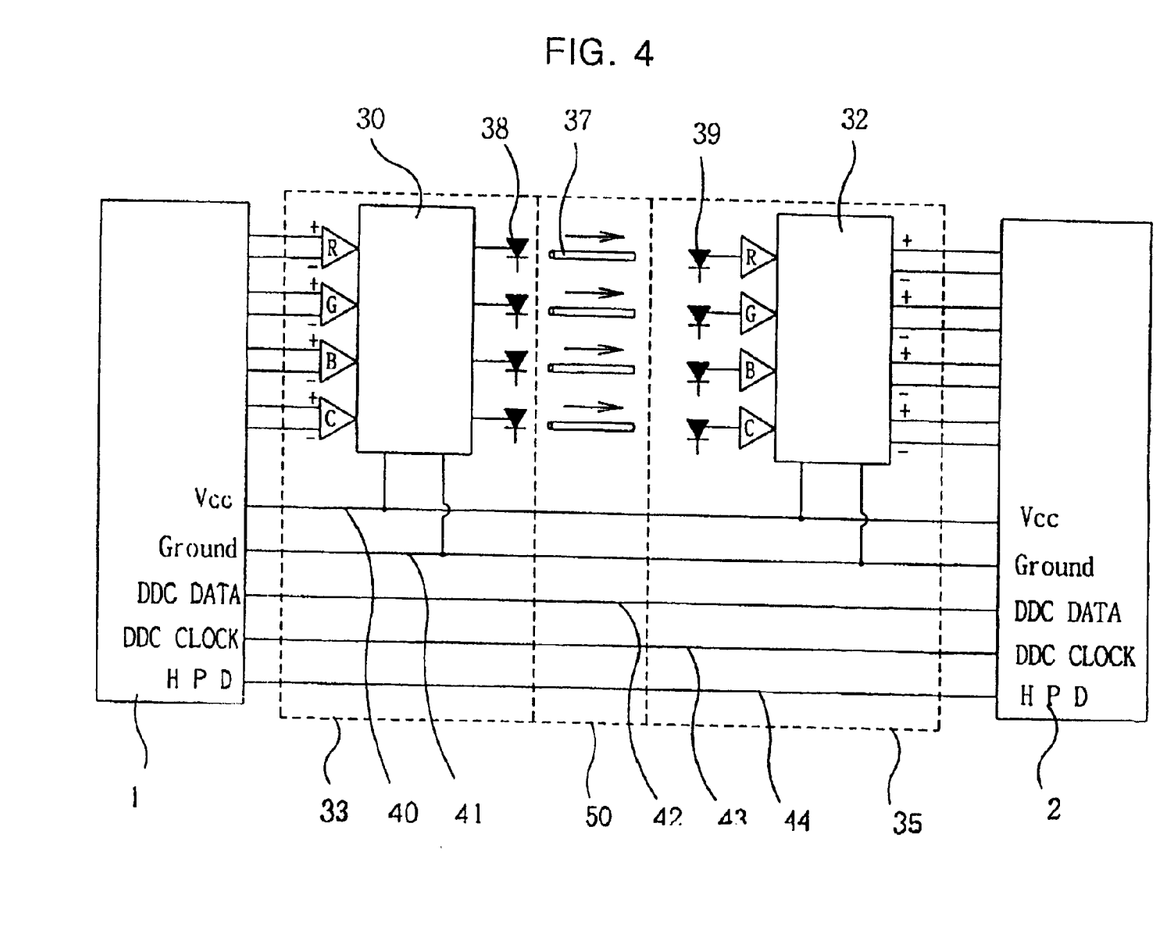
FIG. 4 is a block diagram illustrating a digital video signal interface module which is able to transfer signals to a long distance according to the preferred embodiment of the present invention.

FIG. 4 is a block diagram illustrating a digital video signal interface module that is able to transfer the signals to a long distance according to the preferred embodiment of the present invention. As shown in FIG. 4, the block diagram is roughly consisted of a computer (1), a transferring connector (33), an optic fiber (37), a receiving connector (35) and a LCD monitor (2).

The computer (1) operated by an operating system such as window 95, 98, Me, 2000, NT etc. is used and has R, G, B, C signals, Vcc of +5 V, a Ground Voltage, a DDC data, a DDC clock and an output terminal of the HPD.

A laser driver operating four laser diode (38) by inputting R, G, B, C signals through a comparator is installed in an inner portion of the transferring connector (33). An operation of the laser driver (38) dose not depend on the an external power supply, but on a power supply line (40) of Vcc and ground voltage line (41) passing through the same cable (50). And, a DDC data line (42), a DDC clock line (43) and a HPD line (44) except the power supply line (40) and the ground voltage line (41) pass through the inner portion of the transferring connector (33).

The cable (50) has a length of several to hundreds meters and builds an optic fiber (37) of four channels and a read wire of five channels in the inner portion. The optic fiber (37) of four channels each transfers R, G, B, C signals and the read wire of five channels is used as the power supply line (40), the ground voltage line (41), the DDC data line (42), the DDC clock line (43) and the HPD line (44), respectively.

The PD amplifier (32) restoring the R, G, B, C signals to the electric signals by inputting the signals through the four photodiodes (39) and the comparator is installed in the inner portion of the receiving connector (35). An operation of the PD amplifier (32) dose not depend on the external power supply, but on the power supply line (40) of Vcc and the ground voltage line (41) through the inner portion of the cable (50). And, the DDC data line (42), the DDC clock line (43) and the HPD line (44) except the power supply line (40) and the ground voltage line (41) pass through the inner portion of the receiving connector (35).

Hereinafter, an operation of the interface module of FIG. 4 will be described below.

A graphic signal of a DVI standard is consisted of four channels of R, G, B signals, C signal of a reference signal and a vertical synchronizing signal, horizontal synchronizing signal, a data enabling signal and a control signal, etc., are mixed in each channels and are transferred. Accordingly, four signals are outputted from the computer (1) body using a standard connector of the DVI. The four signals are consisted of differential signals to attenuate a noise and generate laser modulation signals to operate four laser diodes (38) by a laser driver (30) receiving the four signals.

The digital laser signal is transferred to a corresponding photodiode (39) of the receiving connector (35) after focusing on the optic fibers (37) and transferred to hundreds meters. The photo diode (39) restores the inputted optic signals to electric signals having a weak voltage. At this time, the electric signals are amplified to a predetermined voltage level in the PD amplifier (32) to be transferred to the LCD monitor (2) because of a weak ampere of tens µA. Simultaneously, the electric signals are generated as the same voltage level as the digital signals outputted from the computer (1) by generating the differential signals.

A data about the monitor (2) such as a manufacturing company, a maximum resolution, a frequency range and a serial number, etc. is transferred to the computer (1) from the monitor (2) through the DDC line. The transferred data is displayed in a maximum state by a graphic card (not shown) of the computer (1).

Although the computer is on and the monitor is off, there are the power supply line (40) and the ground voltage line (41) connecting the computer (1) to the monitor (2) in order to operate the above cited operation.

Conventionally, a power of 5 Volts and 1 A is outputted from the graphic card (not shown) of the computer (1). However, a surplus power of about 4 Watts is generated. The surplus power of 4 Watts operates the laser driver (30) and the PD amplifier (32).

Figure 5:
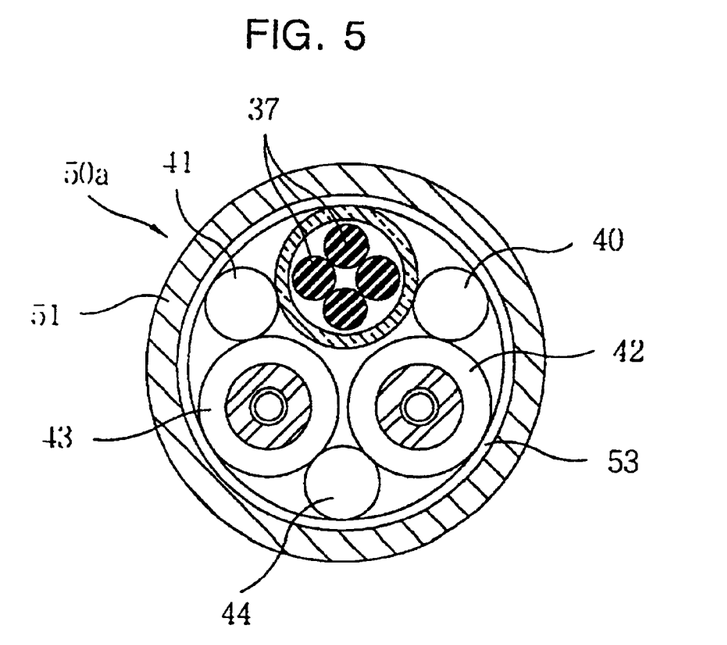
FIGS. 5 to 7 are cross-sectional drawings illustrating an exemplary of a cable of the interface module of FIG. 4.
Figure 6:
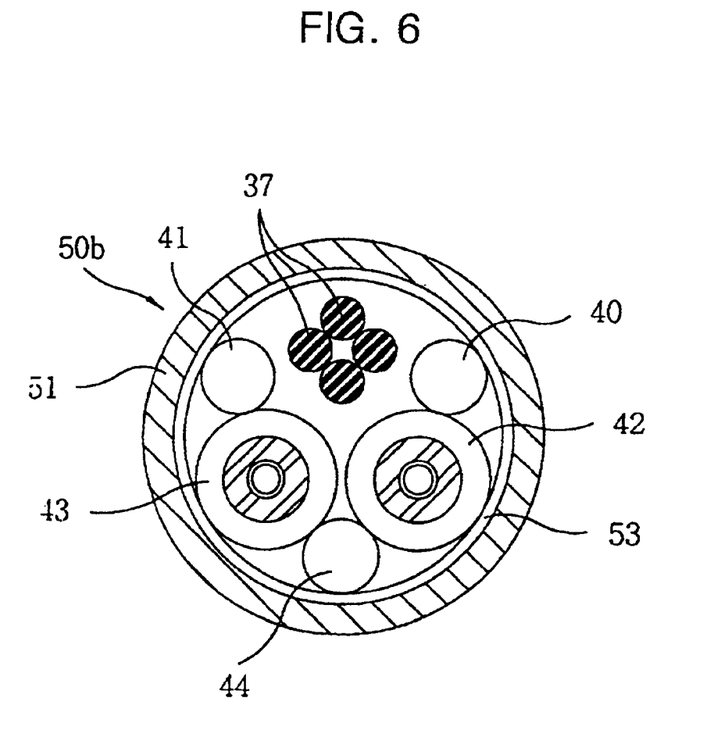
Figure 7:
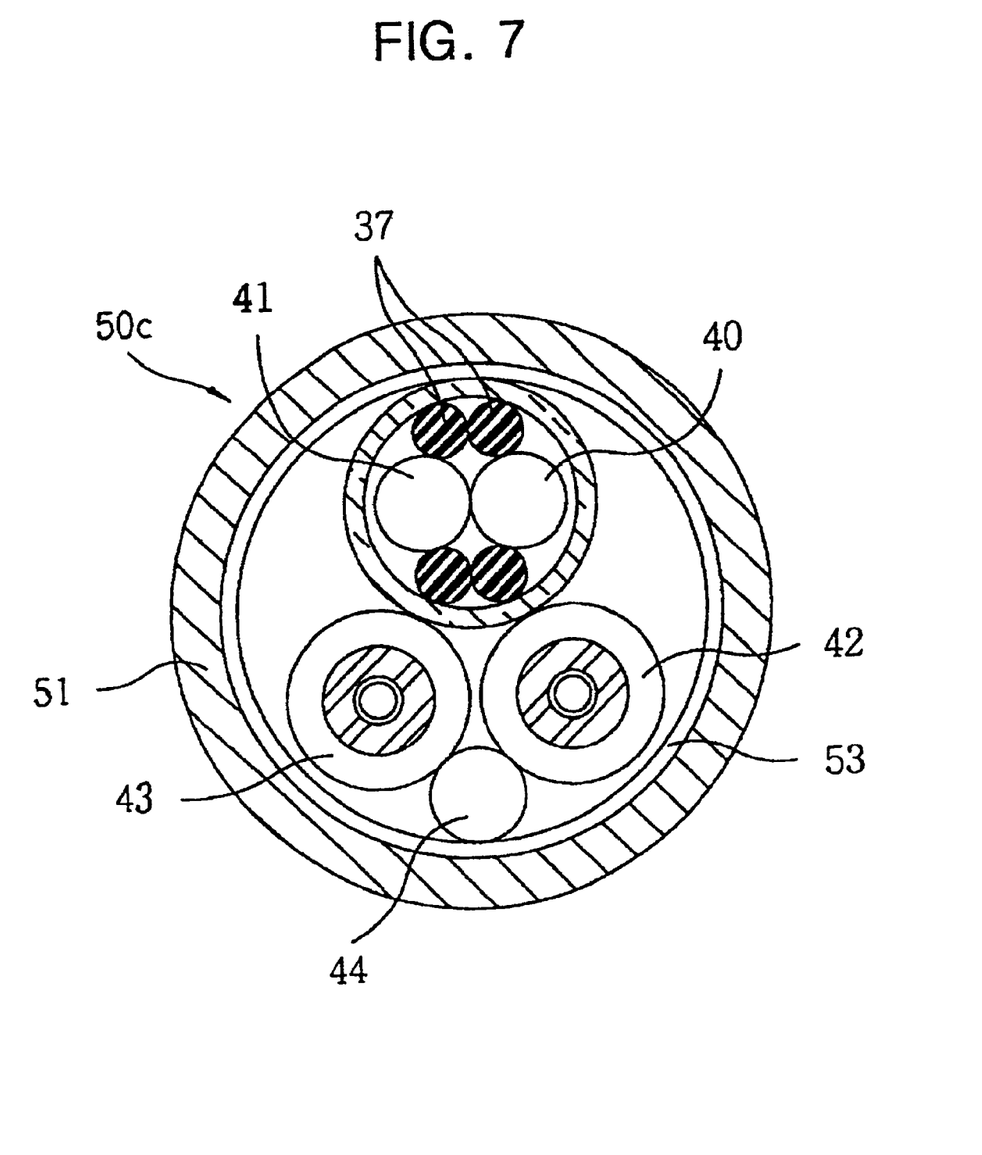

FIGS. 5 to 7 are cross-sectional drawings illustrating cables (50a, 50b, 50c) of the interface module shown in FIG. 4. As shown FIG. 5, the optic fiber (37) of four channels passes through the cable 50a to differentiate from other lines, and the shielded DDC data line (42), the DDC clock line (43), the power supply line (40), the ground voltage line (41) and the HPD (44) line pass through the cable 50a. And a jacket (51) in the most outer coverage is thickly layered in order to protect inner lines and an aluminium tape (53) is attached in the coverage in order to shield the lines.

The reason that the shielded DDC lines (42, 43) are used is as follows. +5 V of the power supply line (40) must be outputted as at least +4.75 V in an end portion of the terminal and must be outputted as at least +3 V in the standard mode in case of the DDC data and clock. The power supply line (40) satisfies the required condition because of DC and the shielded wires must be used in order that the signals are attenuated and then are transferred to a long distance of at least 100 meters because the maximum frequency is 100 kHz in the standard mode of the DDC.

It is characterized that the optic fibers (37) pass together with other lines through the cable 90b of the FIG. 6. It is characterized that the power supply line (40) and the ground voltage line (41) pass together with the optic fibers (37) of four channels through the cable 50b in FIG. 7.

Figure 8:
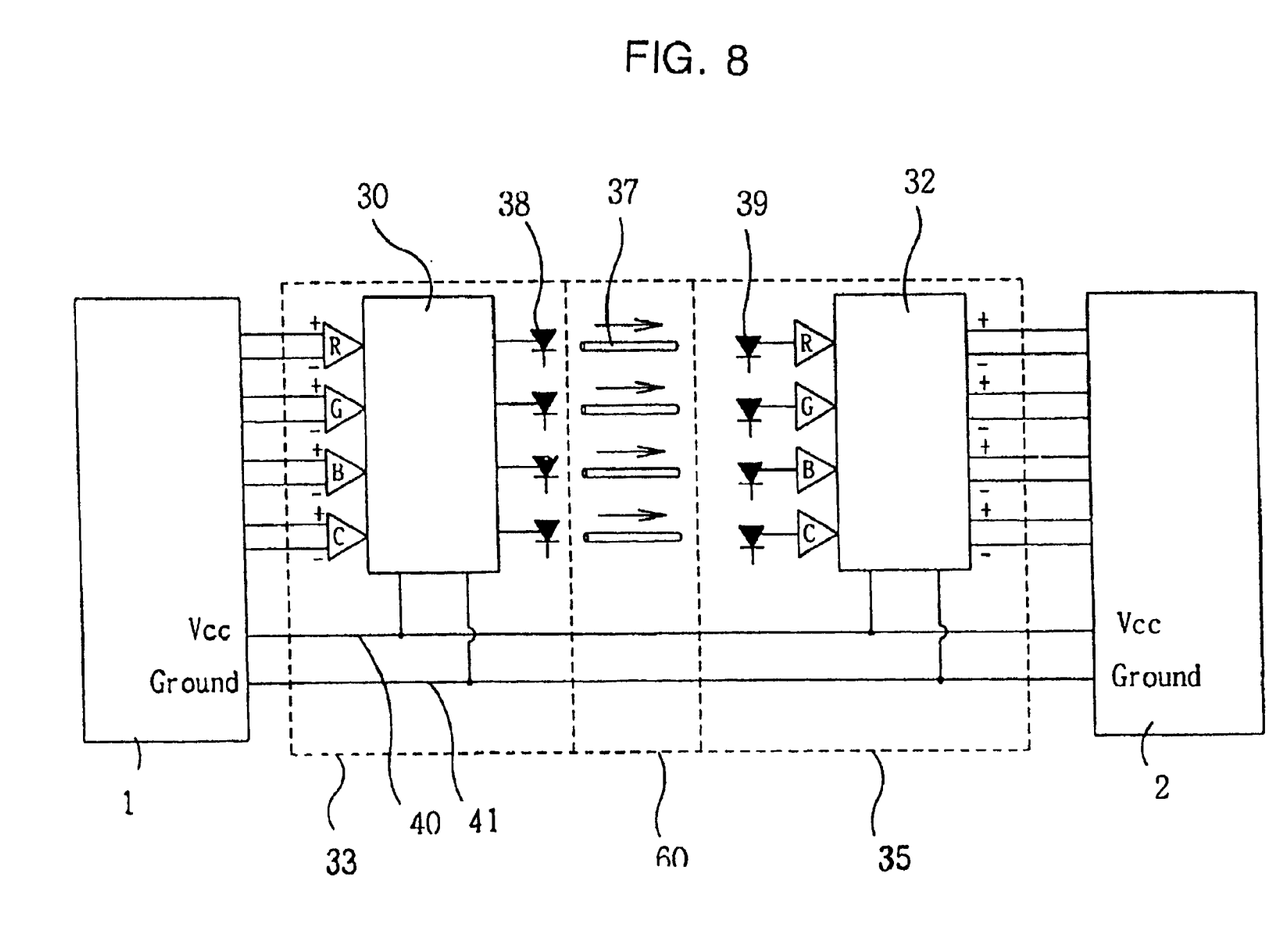
FIG. 8 is a block diagram illustrating a digital video signal interface module which is able to transfer the signals to a long distance according to another embodiment of the present invention.

FIG. 8 is a block diagram illustrating a digital video signal interface module which is able to transfer signals to a long distance according to another embodiment of the present invention. When the operating system of the computer (1) is not windows, but other operating systems (for example, unix, linux, dos, etc.), the DDC is not necessary. Accordingly, as shown in FIG. 8, the DDC clock, the DDC data, and the HPD line can be omitted.

Figure 9:
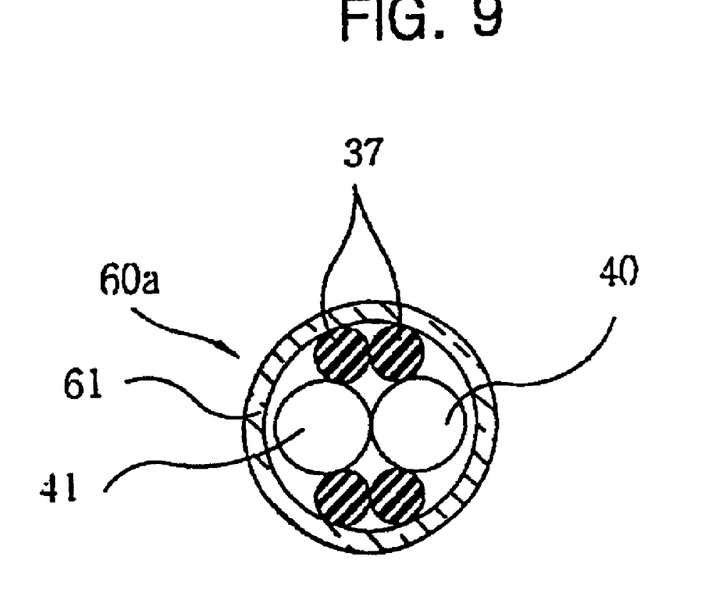
FIGS. 9 and 10 are cross-sectional drawings illustrating a cable of the interface module of FIG. 8.
Figure 10:
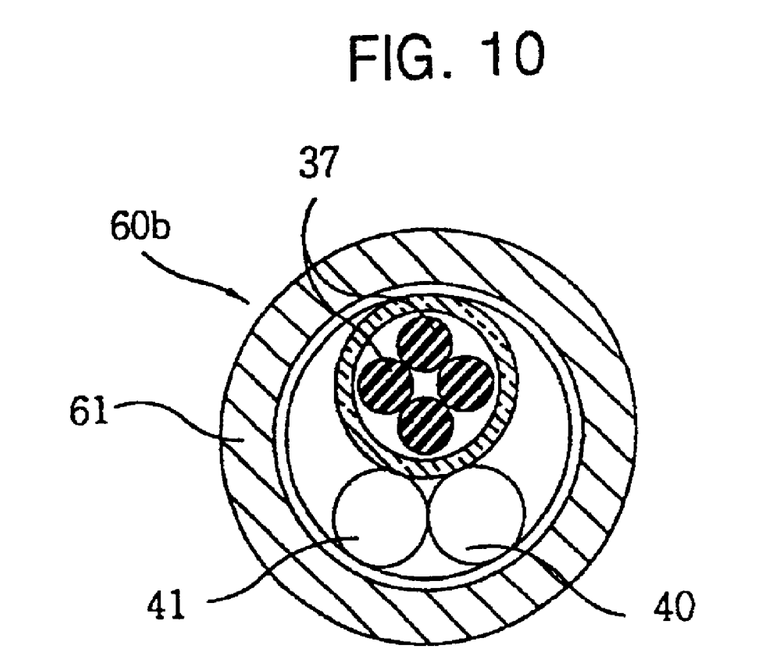

Therefore, four channel optic fibers of the R, G, B, C signals and two channels of the read wire only pass in the transferring connector (33), the cable (60) and the receiving connector (35). FIGS. 9 and 10 are cross-sectional drawings illustrating cables of the interface module of FIG. 8. As shown in FIGS. 9 and 10, the cable 60a has six channels and a relatively smaller diameter because the jacket (61) surrounds the cable 60a. In FIG. 9, the optic fibers (37), the power supply line (40) and the ground voltage lines (41) pass together through the cable 60a. In FIG. 10, the optic fibers (37), the power lines (40) and the ground voltage lines (41) separately pass through the cable 60a.

Figure 11:
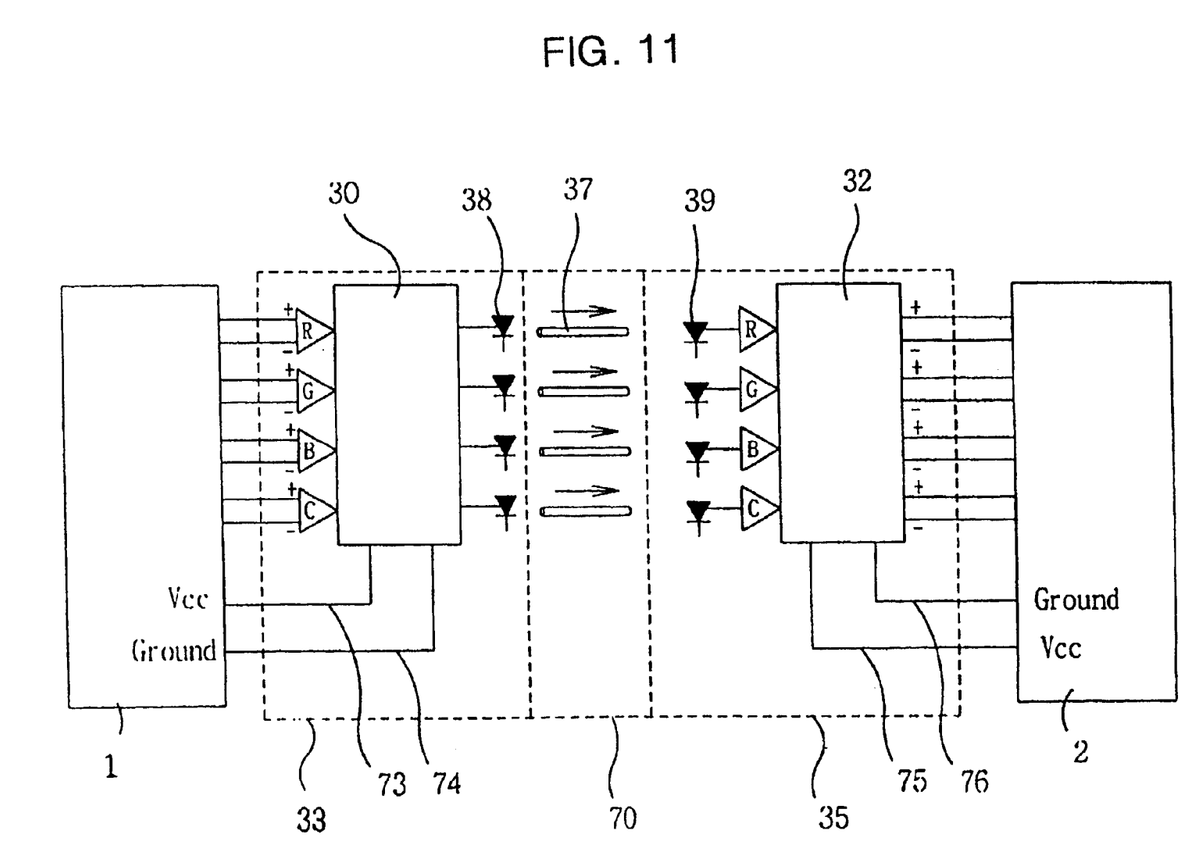
FIG. 11 is a block diagram illustrating a digital video signal interface module which is able to transfer the signals to a long distance according to the other embodiment of the present invention.

FIG. 11 is a block diagram illustrating a digital video signal which is able to transfer the signals to a long distance according to the other embodiment of the present invention. When the signals are transferred, only the optic fibers (37) are necessary as a transferring medium in the cable (70) in the fields of the strict standard EMI such as the medical instruments. At this time, the laser driver (30) and the PD amplifier (32) are configured as shown in FIG. 11.

As shown in FIG. 11, the power supply of the laser driver (30) is connected to the Vcc and the ground outputted from the computer (1) through a first power supply line (73) and a first ground voltage line (74). And, the power supply of the PD amplifier (32) is connected as follows. That is, the inner power voltage of the monitor is supplied to the PD amplifier (32) through the No Connect (NC) pins that are not used of the table 1. At this time, a pin model of the receiving connector (35) is the same as table 2.

TABLE 2

| Pin No. | Signal | Pin No. | Signal | Pin No. | Signal |
|---|---|---|---|---|---|
| 1 | TMDS data 2− | 9 | TMDS data 1− | 17 | TMDS data 0− |
| 2 | TMDS data 2+ | 10 | TMDS data 1+ | 18 | TMDS DATA 0+ |
| 3 | TMDS data 2/4 shielded | 11 | TMDS DATA 1/3 shielded | 19 | TMDS data 0/5 shielded |
| 4 | TMDS data 4− | 12 | TMDS data 3− | 20 | TMDS DATA 5− |
| 5 | TMDS Data 4+ | 13 | TMDS data 3+ | 21 | TMDS data 5+ |
| 6 | DDC clock | 14 | +5 V | 22 | TMDS data clock shielded |
| 7 | DDC data | 15 | Ground (for +5 V) | 23 | TMDS data clock+ |
| 8 | +5 V | 16 | Hot plug Detect | 24 | TMDS data clock− |

Figure 12:
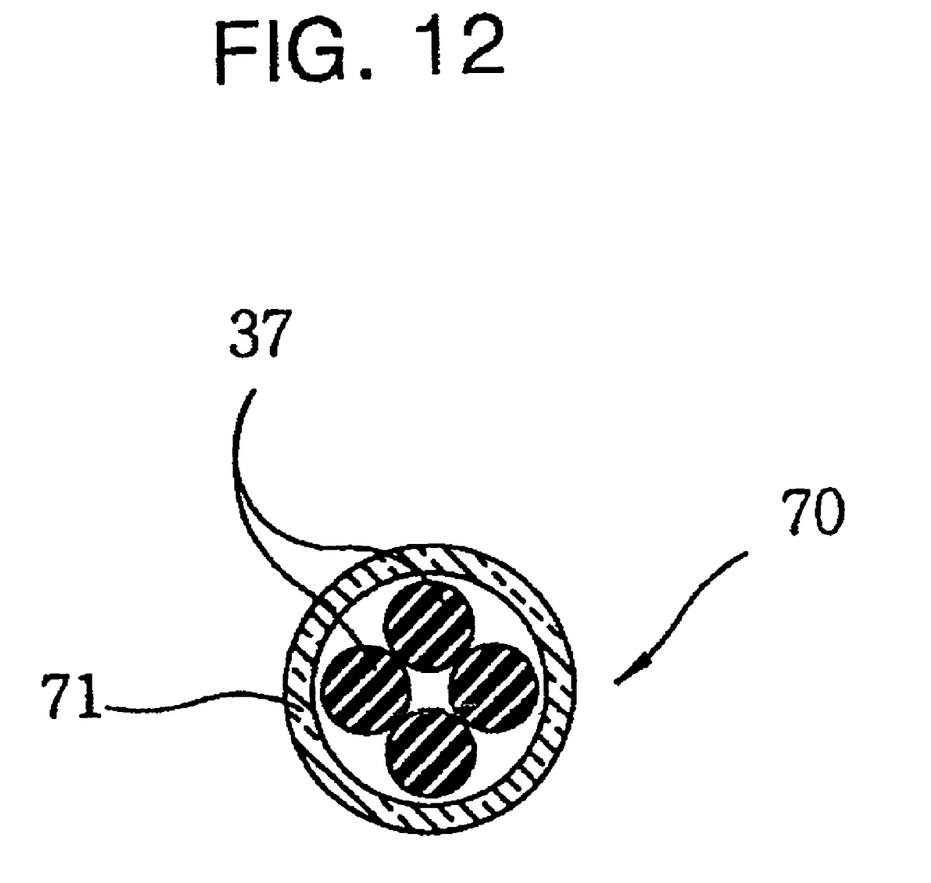
FIG. 12 is a cross-sectional drawing illustrating a cable of the interface module of FIG. 11.

FIG. 12 is a cross-sectional drawing illustrating a cable of the interface module of FIG. 11. As shown in FIG. 12, the additional read wire dose not pass through the cable (70), but the jacket (37) surrounds the four channels of the optic fibers. Accordingly, the EMI condition can be fully satisfied.

The connector for the digital video signal interface module which is ale to transfer the signals to a long distance can be used not only the DVI standard, but also an Open LDI, a P&D, and a DFP standard.

Also, the thickness of the shielded DDC data line (42) and the DDC clock line (43) must be more than 28 AWG, respectively, and the thickness of the power supply line (40), the ground voltage line (41) and the HPD line (44) must be more than 24 AWG, respectively, in order that the signals cannot be distorted during a long distance transmission.

The digital video signal interface module of the present invention which is able to transfer signals to a long distance has the following characteristics.

First, the present invention can provide an efficient light transferring system having optic fibers of a data line and a digital graphic interface.

Second, the present invention can provide an economical system because the digital video signal interface module can be constructed by a minimum number of optic fibers (four channels in a DVI standard and five channels in a LVDS standard) and the external power supply is not necessary. That is, the digital video signal interface module can be used by connecting the computer to the monitor without the external power supply.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A digital video signal interface module capable to transfer signals long distances, comprising:
   a laser driver and a laser diode, receiving digital video signals of Red (R), Green (G), Blue (B), Clock (C) output from a computer, converting the received digital video signals into respective laser signals;
   a photodiode (PD) receiving the respective laser signals and restoring the respective laser signals to electric signals;
   a photodiode amplifier amplifying the signals of the photodiode and transferring the signals to a Liquid Crystal Display (LCD) monitor;
   a plurality of optical fibers installed between respective laser diodes and respective photodiodes and transferring the respective laser signals; and
   a power supply line and a ground voltage line, installed between the computer and the LCD monitor along with the optical fibers, supplying a power voltage to the laser driver and the photodiode amplifier,
   wherein the power supply line and the ground voltage line are respectively greater than 24 AWG.

2. The digital video signal interface module according to claim 1, wherein a type of the optical fibers are a standard of a Digital Visual Interface (DVI) of four channels or a Low Voltage Differential Signalling (LVDS) of five channels.

3. A digital video signal interface module capable to transfer signals long distances, comprising:
   a laser driver and a laser diode, receiving digital video signals of Red (R), Green (G), Blue (B), Clock (C) output from a computer, converting the received digital video signals into respective laser signals;
   a photodiode (PD) receiving the respective laser signals and restoring the respective laser signals to electric signals;
   a photodiode amplifier amplifying the signals of the photodiode and transferring the signals to a Liquid Crystal Display (LCD) monitor;
   a plurality of optical fibers installed between respective laser diodes and respective photodiodes and transferring the respective laser signals;
   an information transferring portion, installed between the computer and the LCD monitor, transferring information about the LCD monitor to the computer; and
   a power supply line and a ground voltage line, installed between the computer and the LCD monitor along with the optical fibers, supplying a power voltage to the laser driver and the photodiode amplifier,
   wherein the power supply line and the ground voltage line are respectively greater than 24 AWG.

4. The digital video signal interface module according to claim 3,
   wherein the information transferring portion comprises a Hot Plug Detection (HPD) line confirming a connection condition of a Data Display Channel (DC) data line, a DDC clock line and the LCD monitor.

5. The digital video signal interface module according to claim 4,
   wherein the DDC data line and the DDC clock line are shielded.

6. The digital video signal interface module according to claim 5,
   wherein a thickness of the DDC data line and the DDC clock line is respectively greater than 28 AWG.

7. The digital video signal interface module according to claim 3,
   wherein a type of the optical fibers is a standard of a Digital Visual Interface of four channels or a Low Voltage Differential Signalling of five channels.

8. A digital video signal interface module capable to transfer signals long distances, comprising:

a laser driver and a laser diode, receiving digital video signals of Red (R), Green (G), Blue (B), Clock (C) output from a computer, converting the received digital video signals into respective laser signals;

a photodiode (PD) receiving the respective laser signals and restoring the respective laser signals to electric signals;

a photodiode amplifier amplifying the signals of the photodiode and transferring the signals to a Liquid Crystal Display (LCD) monitor;

a plurality of optical fibers installed between respective laser diodes and respective photodiodes and transferring the respective laser signals;

a first power supply line and a first ground voltage line supplying a power voltage to the computer and the laser driver; and a second power supply line and a second ground voltage line supplying a power voltage to the LCD monitor and the photodiode amplifier, wherein the first and second power supply lines and respective ground voltage lines are respectively greater than 24 AWG.

9. The digital video signal interface module according to claim 8, wherein the second power supply line passes through an No Connect (NC) pin between the PD amplifier and the monitor.

10. The digital video signal interface module according to claim 9, wherein a type of the optical fibers is a standard of a Digital Visual Interface of four channels or a Low Voltage Differential Signalling of five channels.

* * * * *

UNITED STATES PATENT AND TRADEMARK OFFICE
CERTIFICATE OF CORRECTION

PATENT NO. : 6,940,477 B2
DATED : September 6, 2005
INVENTOR(S) : Jong-kook Moon et al.

It is certified that error appears in the above-identified patent and that said Letters Patent is hereby corrected as shown below:

Title page,
Item [57], ABSTRACT,
Line 13, change "phoptodiode" to -- photodiode --;

Column 7,
Line 67, after "into", insert -- a --;

Column 8,
Line 51, replace "(DC)" with -- (DDC) --.

Signed and Sealed this

Twenty-fourth Day of January, 2006

JON W. DUDAS
*Director of the United States Patent and Trademark Office*